US012785265B2

(12) United States Patent
Li

(10) Patent No.: US 12,785,265 B2
(45) Date of Patent: Nov. 3, 2026

(54) ANTENNA STRUCTURE AND ANTENNA MODULE

(71) Applicant: UNIVERSAL SCIENTIFIC INDUSTRIAL (SHANGHAI) CO., LTD., Shanghai (CN)

(72) Inventor: Kuan-Hsing Li, Shanghai (CN)

(73) Assignee: UNIVERSAL SCIENTIFIC INDUSTRIAL (SHANGHAI) CO., LTD., Shanghai (CN)

( * ) Notice: Subject to any disclaimer, the term of this patent is extended or adjusted under 35 U.S.C. 154(b) by 80 days.

(21) Appl. No.: 19/005,005

(22) Filed: Dec. 30, 2024

(65) Prior Publication Data

US 2025/0309531 A1 Oct. 2, 2025

(30) Foreign Application Priority Data

Mar. 29, 2024 (CN) ......................... 202410383375.4

(51) Int. Cl.
*H01Q 1/52* (2006.01)
*H01Q 1/36* (2006.01)
(Continued)

(52) U.S. Cl.
CPC ............... *H01Q 1/526* (2013.01); *H01Q 1/36* (2013.01); *H01Q 1/50* (2013.01); *H01Q 13/02* (2013.01); *H01Q 21/0075* (2013.01)

(58) Field of Classification Search
CPC ...... H01Q 1/526; H01Q 1/2283; H01Q 1/243; H01Q 1/36; H01Q 1/48; H01Q 1/50;
(Continued)

(56) References Cited

U.S. PATENT DOCUMENTS 4,755,828 A * 7/1988 Grim .................... H01Q 13/065 343/786
5,359,339 A * 10/1994 Agrawal ................ H01Q 13/00 333/248
(Continued)

FOREIGN PATENT DOCUMENTS

CN 110800155 A 2/2020
CN 112366455 A 2/2021
(Continued)

*Primary Examiner* — Ab Salam Alkassim, Jr.
(74) *Attorney, Agent, or Firm* — Li & Cai Intellectual Property (USA) Office

(57) ABSTRACT

An antenna module includes a circuit board and a plurality of antenna structures. Each of the antenna structures includes a substrate assembly, a shielding cover, a feeding strip line, and a metal sheet body. The shielding cover has an opening. A feeding point of the feeding strip line is exposed to the substrate assembly and located on a coverage region defined by orthogonally projecting the shielding cover onto the substrate assembly. The metal sheet body is located in the coverage region. A height of the metal sheet body is decreased along a direction that extends from the feeding point toward the opening. The metal sheet body is electrically coupled to the feeding point and a ground member of the substrate assembly. The feeding strip line is configured to emit an electromagnetic wave signal in a single and horizontal direction through the metal sheet body and the shielding cover.

9 Claims, 19 Drawing Sheets

(51) Int. Cl.

| | |
|---|---|
| ***H01Q 1/50*** | (2006.01) |
| ***H01Q 13/02*** | (2006.01) |
| ***H01Q 21/00*** | (2006.01) |

(58) Field of Classification Search

CPC ...... H01Q 21/0075; H01Q 1/38; H01Q 13/02; H01Q 13/0208; H01Q 13/0275

See application file for complete search history.

(56) References Cited

U.S. PATENT DOCUMENTS

| | | | | |
|---|---|---|---|---|
| 7,030,826 | B2 * | 4/2006 | Scorer | H01P 5/103 343/771 |
| 10,707,584 | B2 * | 7/2020 | Kirino | H01Q 21/064 |
| 2011/0279339 | A1 | 11/2011 | Johnston | |
| 2016/0056537 | A1 * | 2/2016 | Guler | H01Q 13/02 343/762 |
| 2018/0048066 | A1 * | 2/2018 | Chang | H01P 5/00 |
| 2025/0309532 | A1 * | 10/2025 | Li | H01Q 1/50 |

FOREIGN PATENT DOCUMENTS

| | | | |
|---|---|---|---|
| CN | 114069208 | A | 2/2022 |
| CN | 114784489 | A | 7/2022 |
| TW | 202316734 | A | 4/2023 |

* cited by examiner

ANTENNA STRUCTURE AND ANTENNA MODULE

CROSS-REFERENCE TO RELATED PATENT APPLICATION

This application claims the benefit of priorities to China Patent Application No. 202410383375.4, filed on Mar. 29, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an antenna structure and an antenna module, and more particularly to an antenna structure and an antenna module that are used in a millimeter wave.

BACKGROUND OF THE DISCLOSURE

In order to achieve the advantages of saving cost and volume in conventional antenna structures used in mobile devices, most of the conventional millimeter wave antenna structures each adopt an antenna in a package (AiP).

However, when each of the conventional antenna structures adopts the antenna in package, an electromagnetic wave signal generated from each of the conventional antenna structures can only be radiated along a radiation direction toward an upper side of the antenna body (i.e., a direction of the antenna boresight). Therefore, each of the conventional millimeter wave antenna structures is limited to be located on the side edge of the mobile device, thus affecting the design flexibility and heat dissipation effect of the conventional antenna structure.

SUMMARY OF THE DISCLOSURE

In response to the above-referenced technical inadequacy, the present disclosure provides an antenna structure and an antenna module that can effectively improve the defects of the conventional antenna structures.

In order to solve the above-mentioned problems, one of the technical aspects adopted by the present disclosure is to provide an antenna structure. The antenna structure includes a substrate assembly, a shielding cover, a feeding strip line, and a metal sheet body. The shielding cover is disposed on the substrate assembly. A side of the shielding cover has an opening. The feeding strip line is embedded in the substrate assembly. The feeding strip line has a feeding point exposed from the substrate assembly, the feeding point is located on a coverage region defined by orthogonally projecting the shielding cover onto the substrate assembly, and the feeding point is located on a side of the substrate assembly away from the opening. The metal sheet body is erected on the substrate assembly and is located in the coverage region. A height of the metal sheet body is decreased along a direction from the feeding point toward the opening, the metal sheet body has a first pin and a second pin, the first pin is electrically coupled to the feeding point, and the second pin is electrically coupled to a ground member of the substrate assembly. The feeding strip line is configured to emit an electromagnetic wave signal in a single and horizontal direction through the metal sheet body and the shielding cover.

In one of the possible or preferred embodiments, the metal sheet body includes a notch facing the substrate assembly. The metal sheet body has a first portion and a second portion that are separated by the notch, the first portion is adjacent to the feeding point and the second portion is adjacent to the opening. The first portion has the first pin, and the second portion has the second pin.

In one of the possible or preferred embodiments, the shielding cover includes a shielding body and two transverse extension plates. The shielding body has the opening. The two transverse extension plates that are extend from two opposite sides of the shielding body. Two projection regions defined by orthogonally projecting the two transverse extension plates onto the substrate assembly are parallel to each other.

In one of the possible or preferred embodiments, the shielding cover further includes a longitudinal extension plate that extends from a side of the shielding body away from the substrate assembly. A projection region defined by orthogonally projecting the longitudinal extension plate onto the substrate assembly is located between the two transverse extension plates.

In one of the possible or preferred embodiments, a height of the shielding body increases towards the opening.

In one of the possible or preferred embodiments, a slope of the height of the shielding body is within a range of from is 2 times to 3 times a slope of a height of the metal sheet body.

In one of the possible or preferred embodiments, the shielding body has a height change value, and the height change value is within a range of from 0.5 times to 1.5 times a width of each of the transverse extension plates.

In one of the possible or preferred embodiments, the shielding cover further includes a C-shaped block, an inner edge of the C-shaped block is attached to an outer wall of the shielding cover, and the C-shaped block and the shielding cover are aligned with an edge of the opening.

In one of the possible or preferred embodiments, a first gap is between the metal sheet body and a side wall of the shielding cover away from the opening, and a second gap is between the metal sheet body and an another side wall of the shielding cover away from the substrate assembly. The first gap is less than or equal to ½ of the second gap, and the first gap is less than or equal to ½ of a height of the notch.

In order to solve the above-mentioned problems, another one of the technical aspects adopted by the present disclosure is to provide an antenna module. The antenna module includes a circuit board and a plurality of antenna structures. The plurality of antenna structures are disposed on the circuit board, each of the antenna structures includes a substrate assembly, a shielding cover, a feeding strip line, and a metal sheet body. The shielding cover is disposed on the substrate assembly. A side of the shielding cover has an opening. The feeding strip line is embedded in the substrate assembly, the feeding strip line has a feeding point exposed to the substrate assembly, the feeding point is located on a coverage region defined by orthogonally projecting the shielding cover onto the substrate assembly, and the feeding point is located on a side of the substrate assembly away from the opening. The metal sheet body is erected on the substrate assembly and is located in the coverage region. A height of the metal sheet body is decreased along a direction from the feeding point toward the opening, the metal sheet body has a first pin and a second pin, the first pin is electrically coupled to the feeding point, and the second pin is electrically coupled to a ground member of the substrate assembly. The feeding strip line is configured to emit an electromagnetic wave signal in a single and horizontal direction through the metal sheet body and the shielding cover.

Therefore, in the antenna structure and the antenna module provided by the present disclosure, by virtue of "the metal sheet body being erected on the substrate assembly and being located in the coverage region; and the height of the metal sheet body being decreased along the direction that extends from the feeding point toward the opening," the feeding strip line is configured to emit an electromagnetic wave signal in a single and horizontal direction through the metal sheet body and the shielding cover, such that the feeding strip line is not limited by the installation position in the mobile device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
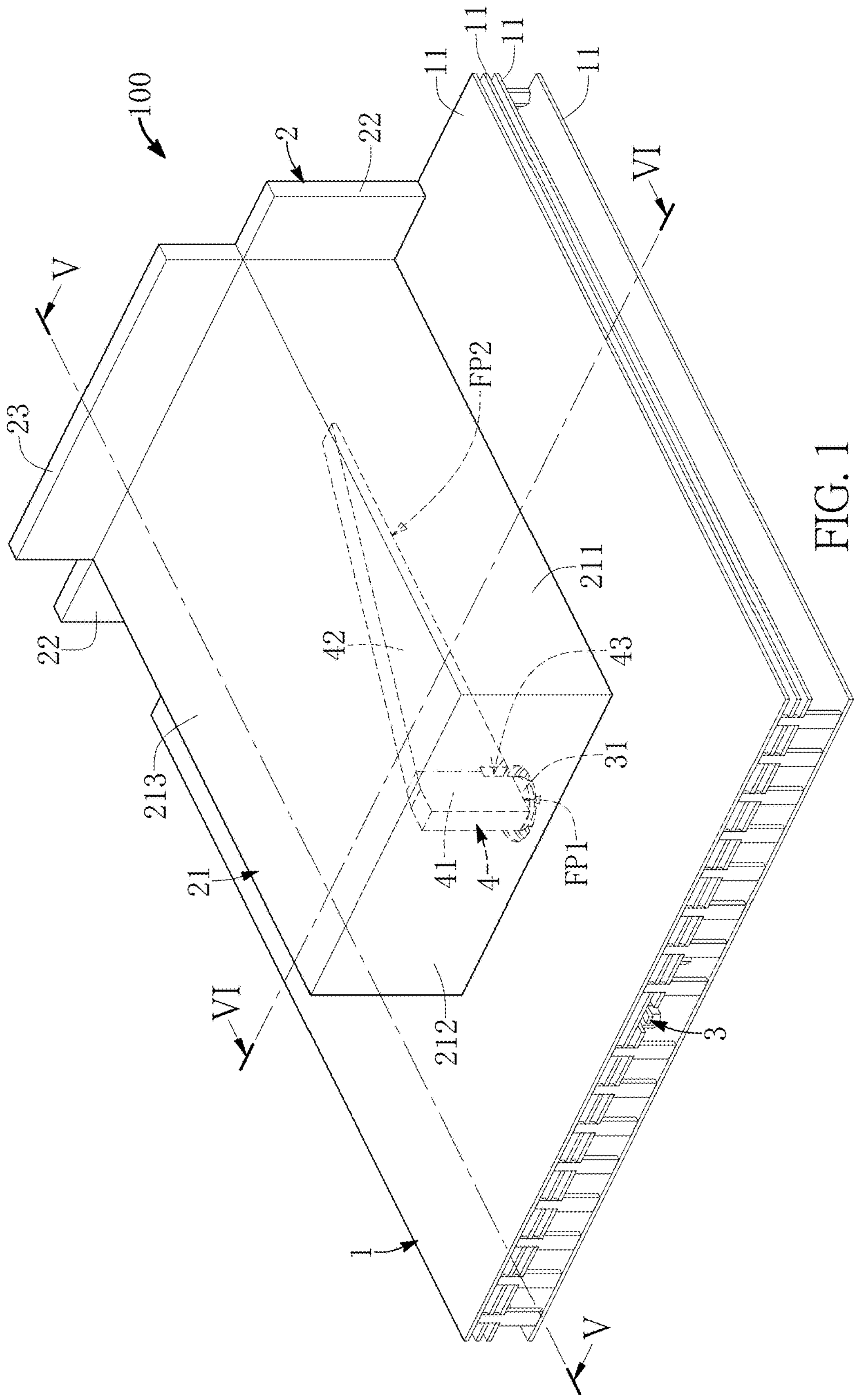
FIG. 1 is a schematic perspective view of an antenna structure according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
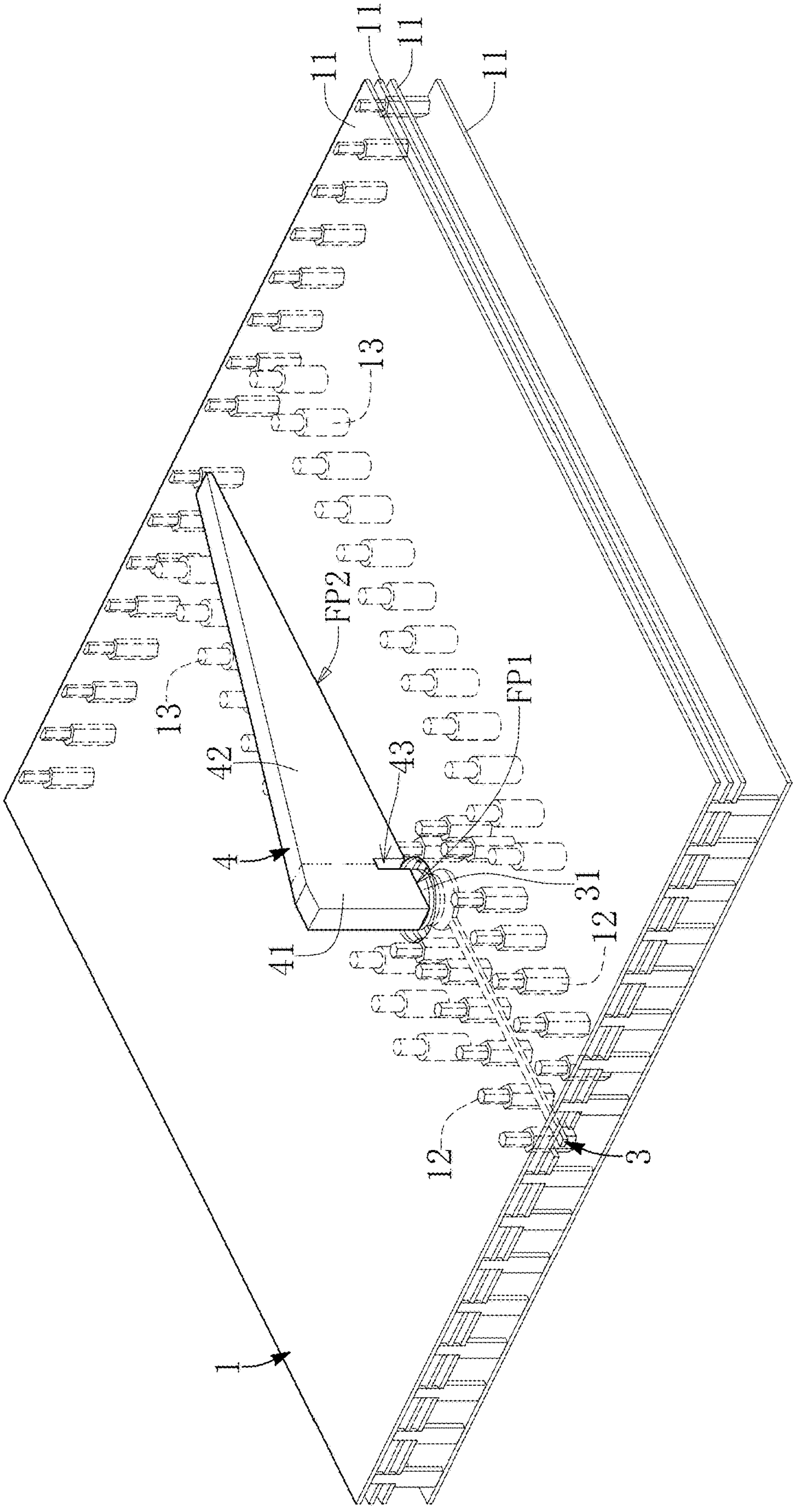
FIG. 2 is a schematic perspective view showing the antenna structure of FIG. 1 with a shielding cover removed.
Figure 3:
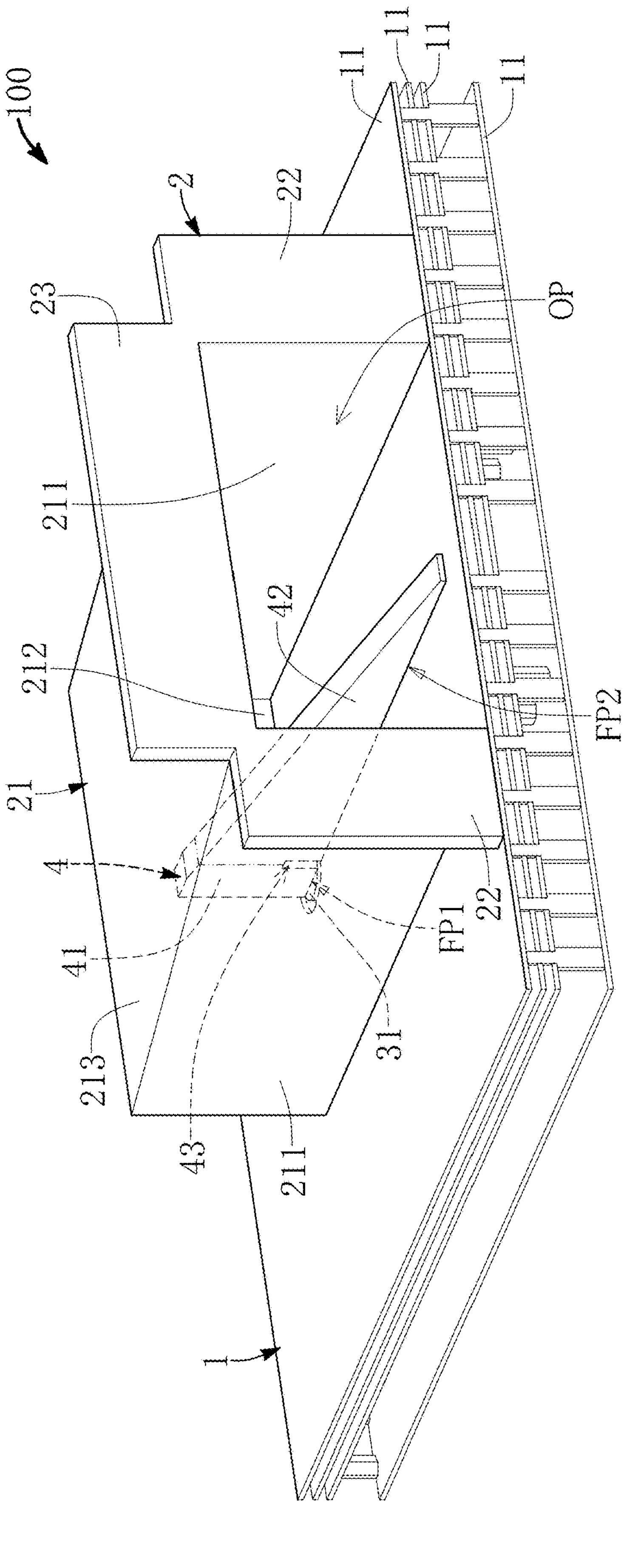
FIG. 3 is another schematic perspective view of the antenna structure according to the first embodiment of the present disclosure.

Referring to FIG. 1 to FIG. 13, the present disclosure provides an antenna structure 100. The antenna structure 100 is configured to emit an electromagnetic wave signal in a single and horizontal direction. As shown in FIG. 1 to FIG. 3, the antenna structure 100 includes a substrate assembly 1, a shielding cover 2 disposed on the substrate assembly 1, a feeding strip line 3 embedded in the substrate assembly 1, and a metal sheet body 4 that is disposed in the shielding cover 2, is erected on the substrate assembly 1 and is electrically connected to the feeding strip line 3.

The following description describes the structure and connection relation of each component of the antenna structure 100. However, it should be noted that the following detailed description is only to help the person with ordinary skill in the art to understand the present disclosure, but the present disclosure is not limited to the following detailed description.

Referring back to FIG. 1 to FIG. 3, the substrate assembly 1 in the present embodiment is a multilayer board structure. The substrate assembly 1 includes a plurality of layer boards 11, a plurality of first metal via holes 12, and a plurality of second metal via holes 13. The first metal via holes 12 and the second metal via holes 13 are configured to penetrate through the layer boards 11, such that an uppermost layer board of the layer boards 11 and a lowermost layer board of the layer boards 11 can be connected and grounded. In addition, the first metal via holes 12 are disposed on the layer boards 11 in a semi-closed pattern to surround the feeding strip line 3, such that the feeding strip line 3 is located on an area surrounded by the first metal via holes 12. Secondly, the second metal via holes 13 are also arranged in two rows on the layer boards 11 and the two rows are respectively located on two sides of the metal sheet body 4.

As shown in FIG. 1 to FIG. 3, the shielding cover 2 in the present embodiment is a square casing made of metal, such that the electromagnetic wave signal can be transmitted or reflected within the shielding cover 2. Furthermore, the shielding cover 2 includes a shielding body 21, and two transverse extension plates 22 and a longitudinal extension plate 23 that are connected to the shielding body 21.

The shielding body 21 has two first vertical walls 211 located on opposite sides, a second vertical wall 212 connected to the two first vertical walls 211, and a horizontal wall 213 that is connected to the two first vertical walls 211 and the second vertical wall 212. The shielding body 21 has an opening OP away from the side of the second vertical wall 212, that is, the opening OP is surrounded by the two first vertical walls 211 and the horizontal wall 213. In addition, the shielding body 21 in the present embodiment is disposed on a side of the substrate assembly 1, and the two first vertical walls 211 and the horizontal walls 213 are configured to be flush with the sides of the substrate assembly 1, but the present disclosure is not limited thereto.

Referring back to FIG. 1 to FIG. 3, the two transverse extension plates 22 in the present embodiment are rectangular plates. The two transverse extension plates 22 are respectively formed by extending from the two first vertical walls 211 (i.e., two opposite sides) of the shielding body 21, and the two transverse extension plates 22 are respectively perpendicular to the two first vertical walls 211 of the shielding body 21, but the present disclosure is not limited thereto (e.g., in other embodiments not shown, each of the two transverse extension plates 22 is not perpendicular to each of the two first vertical walls 211). Furthermore, two projection regions defined by orthogonally projecting the two transverse extension plates 22 onto the substrate assembly 1 are parallel to each other. That is, the two transverse extension plates 22 are in a linear arrangement. Preferably, a size and thickness of the two transverse extension plates 22 can be the same as each other, but the present disclosure is not limited thereto.

Referring back to FIG. 1 to FIG. 3, the longitudinal extension plate 23 in the present embodiment is a rectangular plate, and the longitudinal extension plate 23 is extended along a direction away from the substrate assembly 1 from the horizontal wall 213. The longitudinal extension plate 23 can preferably be perpendicular to the horizontal wall 213, but the present disclosure is not limited thereto (e.g., in other embodiments not shown, the longitudinal extension plate 23 can be non-perpendicular to the horizontal wall 213). Specifically, a second projection region defined by orthogonally projecting the longitudinal extension plate 23 onto substrate assembly 1 is located between the two transverse extension plates 22, and the second projection region and the first projection region are preferably parallel to each other. In addition, a distance between the longitudinal extension plate 23 and the second vertical wall 212 is equal to a distance between each of the transverse extension plates 22 and the second vertical wall 212 in the present embodiment, but the present disclosure is not limited thereto.

Figure 7:
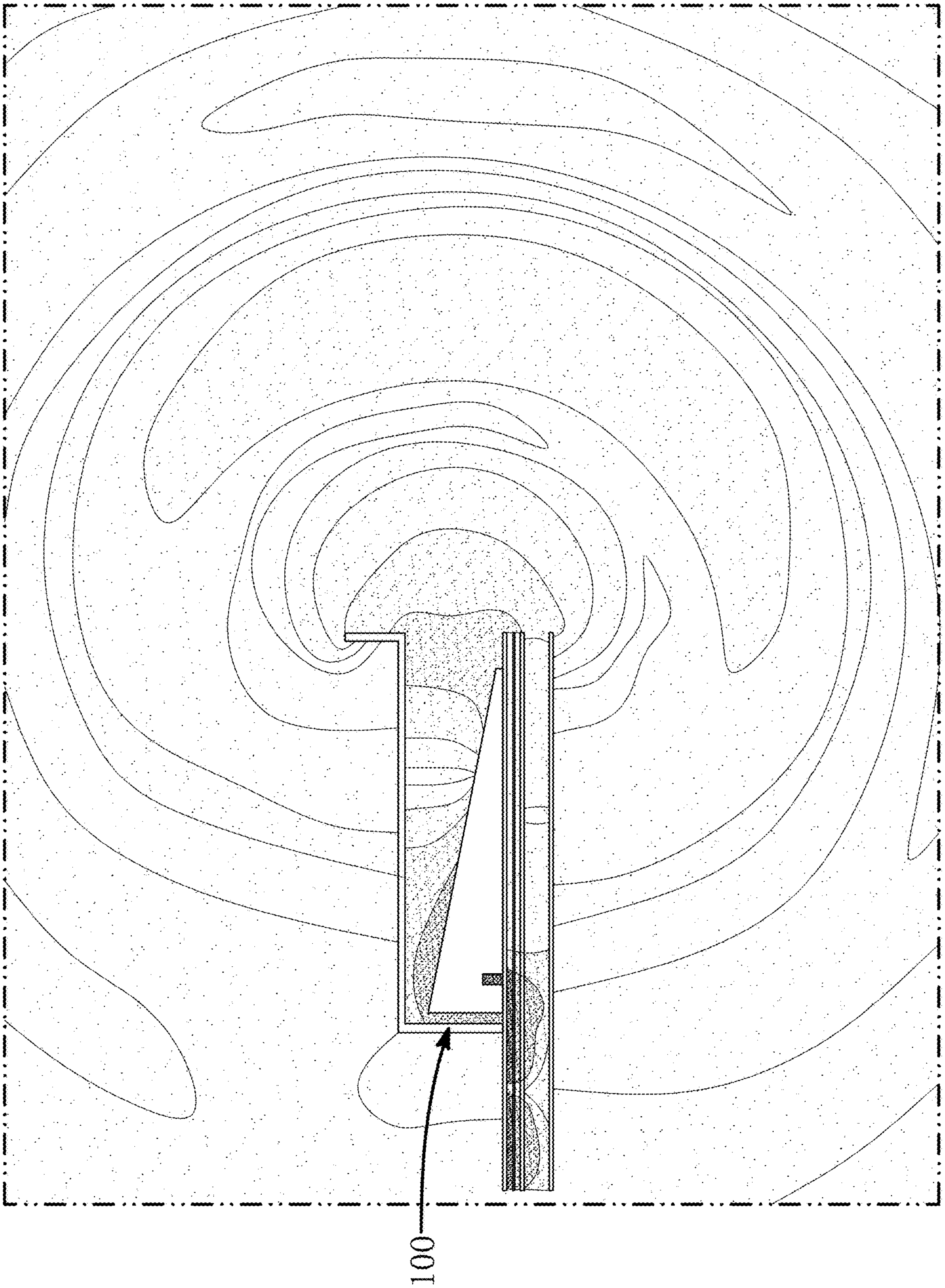
FIG. 7 is a schematic side view of electric field distribution strength of the antenna structure according to the first embodiment of the present disclosure.
Figure 8:
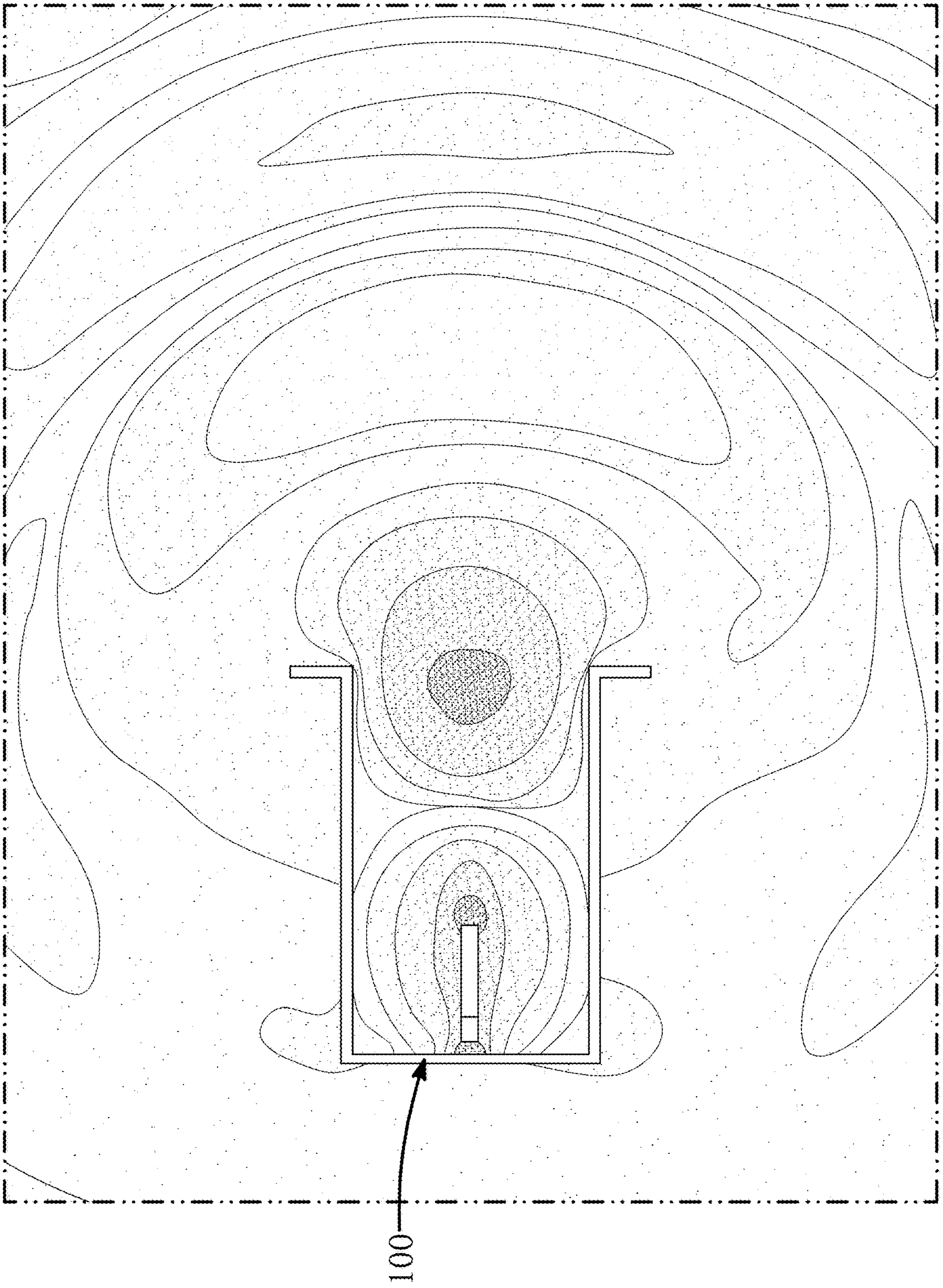
FIG. 8 is a schematic top view of electric field distribution strength of the antenna structure according to the first embodiment of the present disclosure.

Accordingly, the present disclosure can configure the design of the opening OP through the two transverse extension plates 22 and the longitudinal extension plate 23, thereby preventing the electric field of the electromagnetic wave signal from diffraction and reflection reactions at the edge of the opening OP; accordingly, energy reflection is reduced, antenna gain is increased, and directivity is improved (as shown in FIG. 7 and FIG. 8, the greater a quantity of small black dots in each area is (the higher a density), the stronger the electric field energy represented becomes).

It should be noted that, in other embodiments not shown, the two transverse extension plates 22 or the longitudinal extension plate 23 can be further omitted according to design requirements, and the antenna structure 100 having such arrangement can have the same effect as mentioned above.

Reference is further made to FIG. 1 to FIG. 3, and the feeding strip line 3 is parallel to an extending direction from the opening OP toward the horizontal wall 213 (or a direction from the horizontal wall 213 toward the opening OP). One end of the feeding strip line 3 has a feeding point 31, the feeding point 31 is located in a coverage region defined by orthogonally projecting the shielding cover 2 onto the substrate assembly 1 and is exposed from the substrate assembly 1, and a position of the feeding point 31 in the coverage region is preferably located on a side of the substrate assembly 1 away from the opening OP. In addition, the feeding strip line 3 in practice is electrically coupled to a front-end circuit (not shown in the figure), such that the feeding strip line 3 is configured to transmit a signal of the front-end circuit through the feeding point 31.

Figure 4:
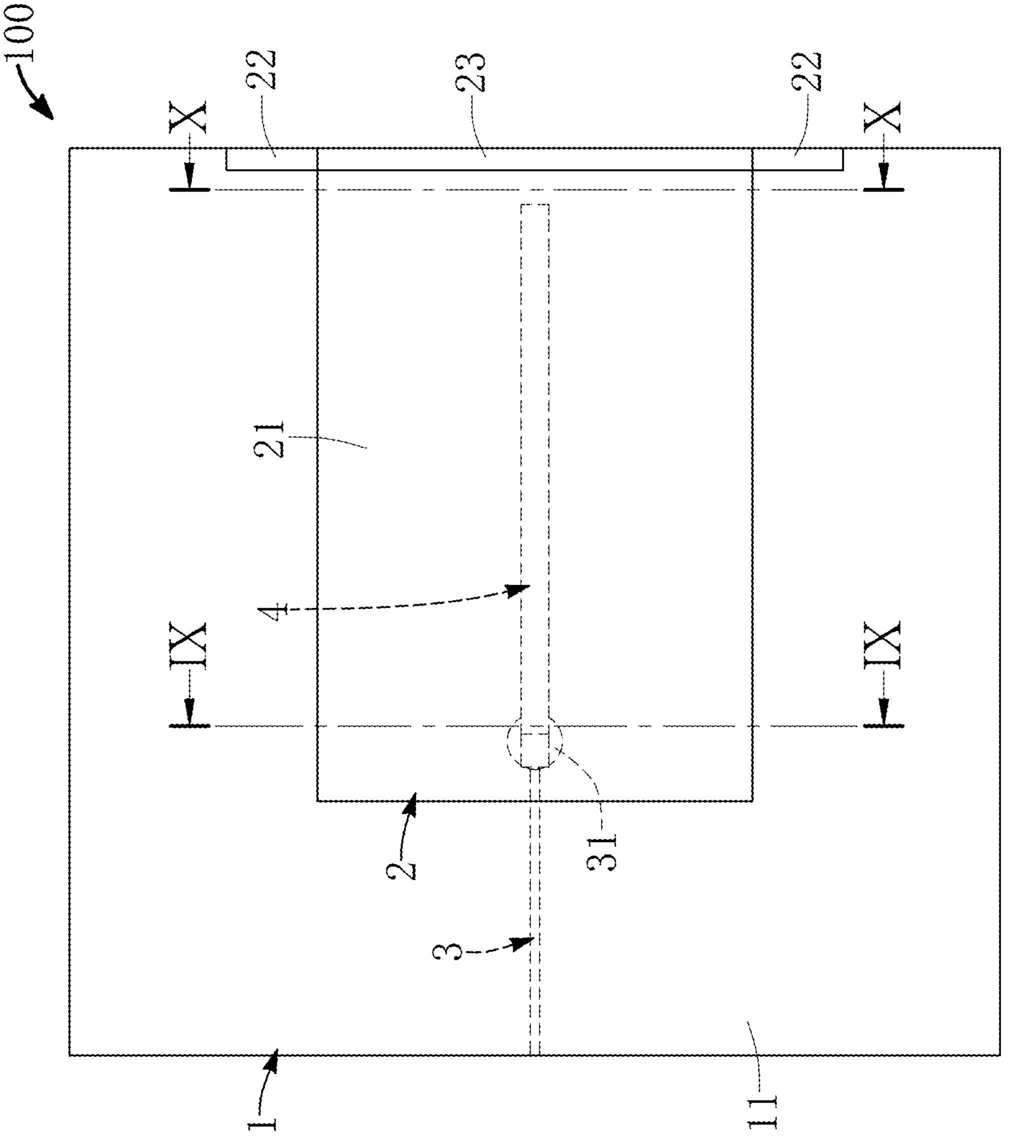
FIG. 4 is a schematic top view of the antenna structure according to the first embodiment of the present disclosure.

As shown in FIG. 1 and FIG. 4, the metal sheet body 4 in the present embodiment is a plate-like structure, and the metal sheet body 4 is erected on the substrate assembly 1 and located in the coverage region. In addition, a shape of the metal sheet body 4 is generally tapered (e.g., triangular), and a height of the metal sheet body 4 is decreased along a direction from the feeding point 31 toward the opening OP. Furthermore, the metal sheet body 4 further has a first pin FP1 and a second FP2. The first pin FP1 is electrically coupled to the feeding point 31, such that the metal sheet body 4 is configured to receive the electromagnetic wave signal through the feeding point 31. The second pin FP2 is electrically coupled to the substrate assembly 1 as a grounded surface layer (i.e., a ground member). Accordingly, the electromagnetic wave signal can be transmitted to the first pin FP1 of the metal sheet body 4 through the feed point 31, such that the metal sheet body 4 is configured to radiate the electromagnetic wave signal.

In practice, the first pin FP1 and the second pin FP2 of the metal sheet body 4 are separated by a notch 43. Specifically, the metal sheet body 4 is configured to separate a first portion 41 adjacent to the second vertical wall 212 and a second portion 42 adjacent to the opening OP through the notch 43. The first portion 41 has the first pin FP1, and the second portion 42 has the second pin FP2.

Figure 5:
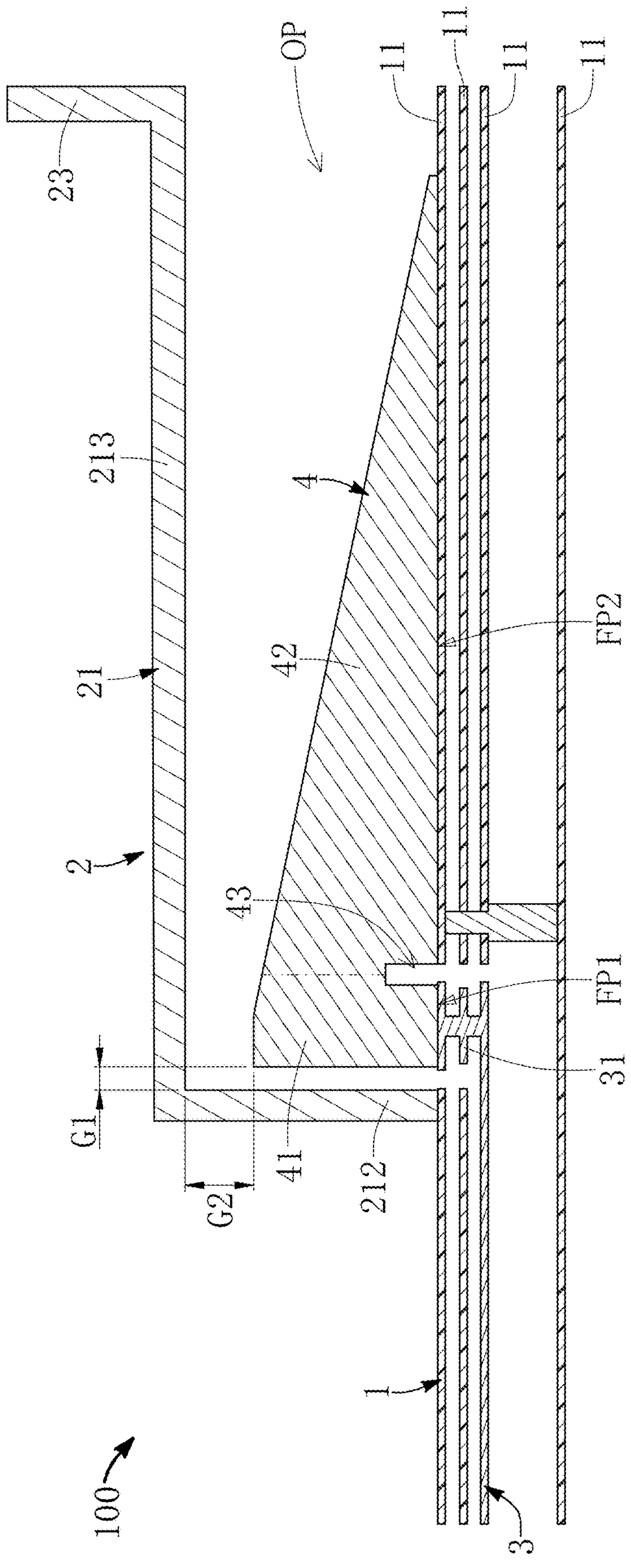
FIG. 5 is a schematic cross-sectional view taken along line V-V of FIG. 1.
Figure 6:
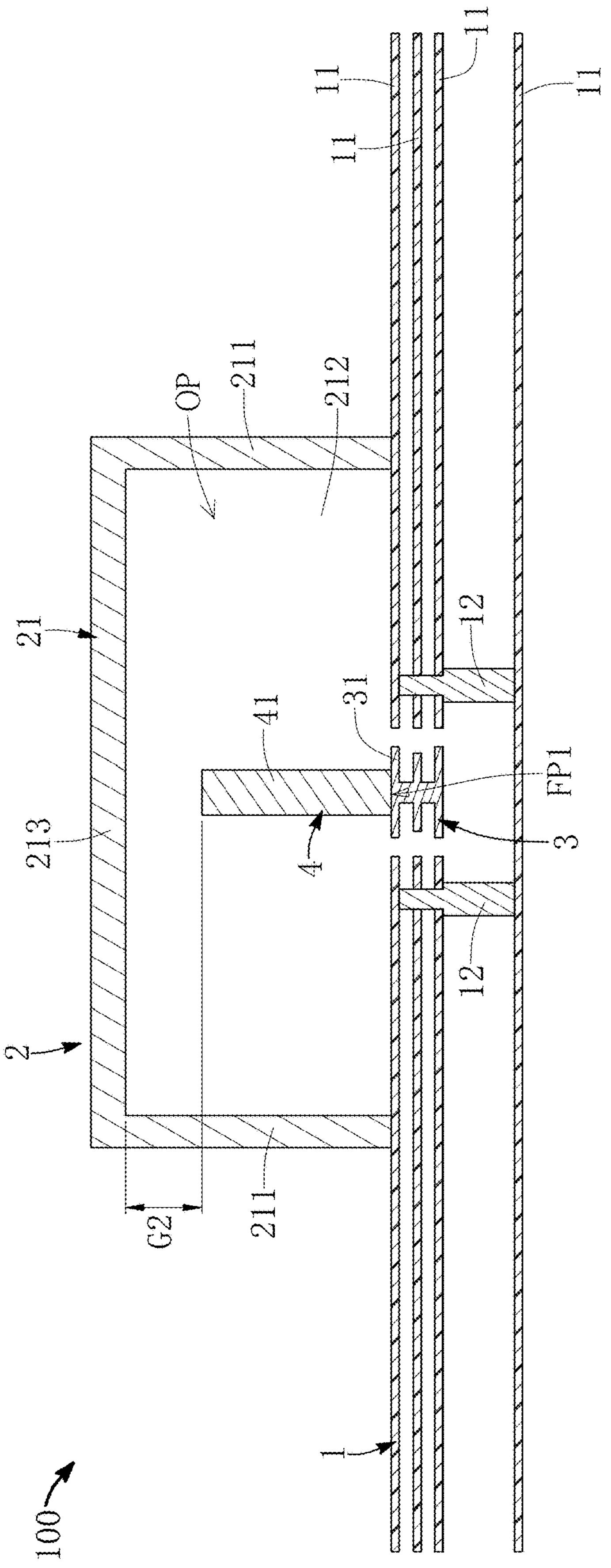
FIG. 6 is a schematic cross-sectional view taken along line VI-VI of FIG. 1.

It should be noted that, as shown in FIG. 5, a first gap G1 is between the metal sheet body 4 and the second vertical wall 212, and a second gap G2 is between the metal sheet body 4 and the horizontal wall 213. The first gap G1 is less than or equal to ½ of the second gap G2, and the first gap G1 is less than or equal to ½ of a height of the notch 43. For example, the first gap G1 is 0.1 mm, the second gap G2 is 0.25 mm, and the height of the notch 43 is 0.25 mm. Therefore, the first gap G1 (i.e., 0.1 mm) is less than or equal to ½ of the second gap G2 and ½ of the height of the notch 43 (i.e., 0.125 mm), but the present disclosure is not limited thereto.

In order to facilitate understanding of the advantages of the present disclosure, FIG. 7 and FIG. 8 are schematic views of electric field distribution strength of the antenna structure 100 of the present disclosure (i.e., a density of points in the diagram is proportional to an electromagnetic intensity). It can be observed from FIG. 1 and FIG. 2 that, after the electromagnetic wave signal is transmitted from the feeding strip line 3 in the substrate assembly 1, an energy of the electromagnetic wave signal is transmitted to the metal sheet body 4 through the feeding point 31 for radiation. Secondly, when the metal sheet body 4 is covered by the shielding cover 2, the energy of the electromagnetic wave signal forms a bent electric field vector, and then the energy of the electromagnetic wave signal is transferred into the air through the opening OP of the shielding cover 2.

Figure 9:
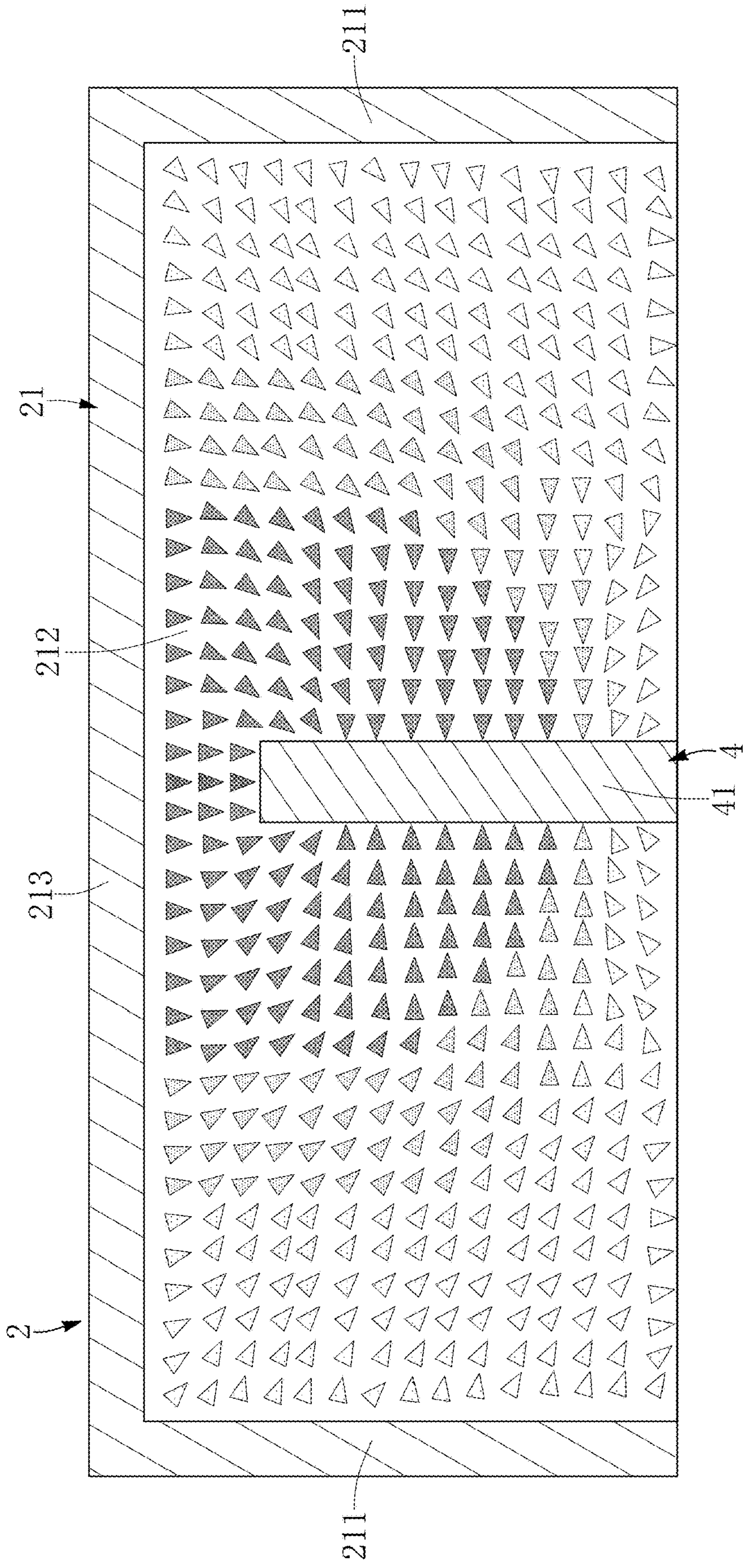
FIG. 9 is a schematic cross-sectional view of electric field taken along line IX-IX of FIG. 4.
Figure 10:
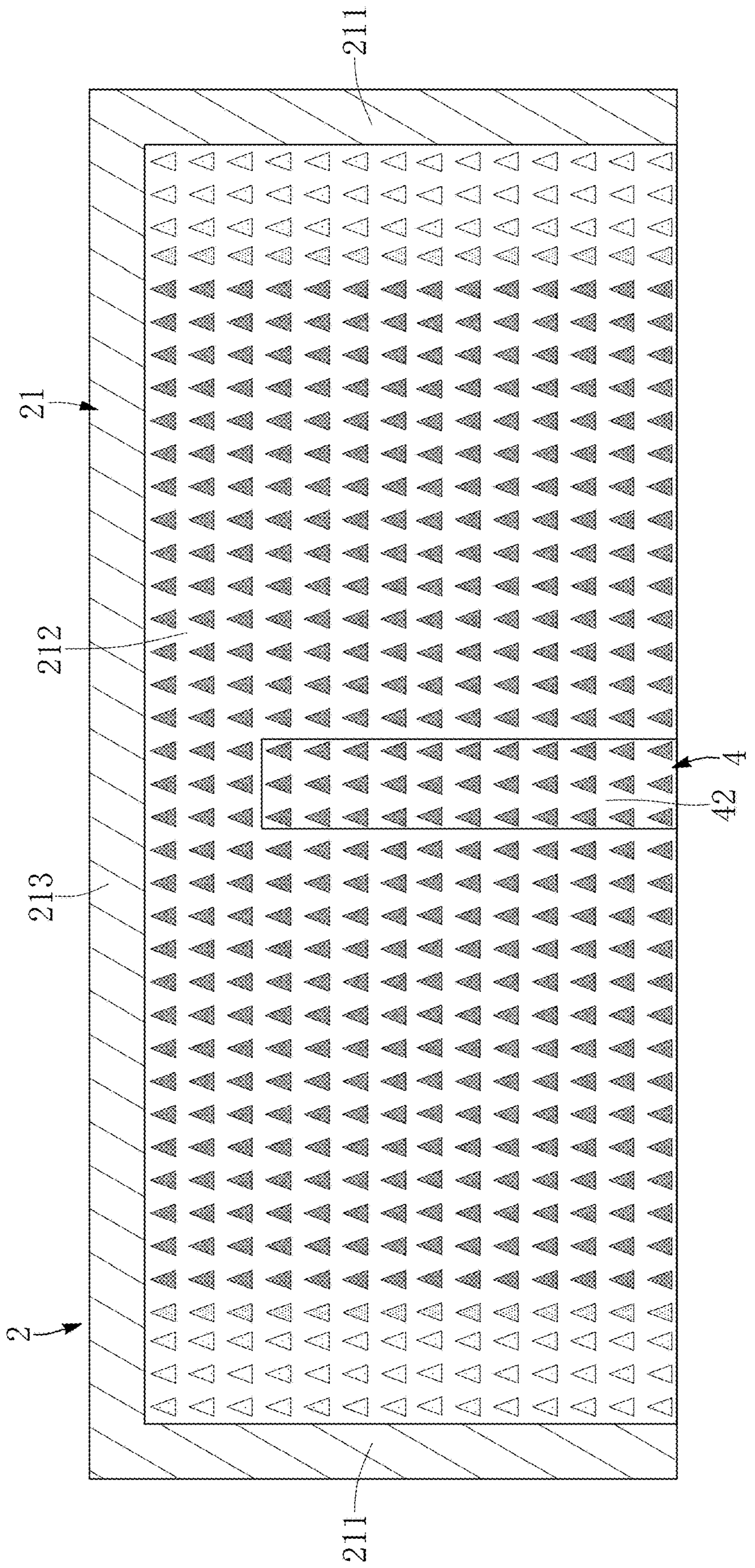
FIG. 10 is a schematic cross-sectional view of electric field taken along line X-X of FIG. 4.

Furthermore, as shown in FIG. 9 and FIG. 10, FIG. 9 and FIG. 10 are schematic cross-sectional views of electric field (an arrow in the figure is a direction of the electric field, and a density of points in the arrow is proportional to an electromagnetic intensity). It can be clearly seen from FIG. 9 and FIG. 10 that, the electric field of the electromagnetic wave signal is shown as a folded electric field between the metal sheet body 4 and the shielding cover 2, and the electric field of the electromagnetic wave signal is shown as a vertically polarized electric field in a single direction at the opening OP of the shielding cover 2 (as shown in FIG. 7 and FIG. 8). That is, the electromagnetic wave signal is gradually converted from the folded electric field into the vertically polarized electric field in a single direction.

Figure 11:
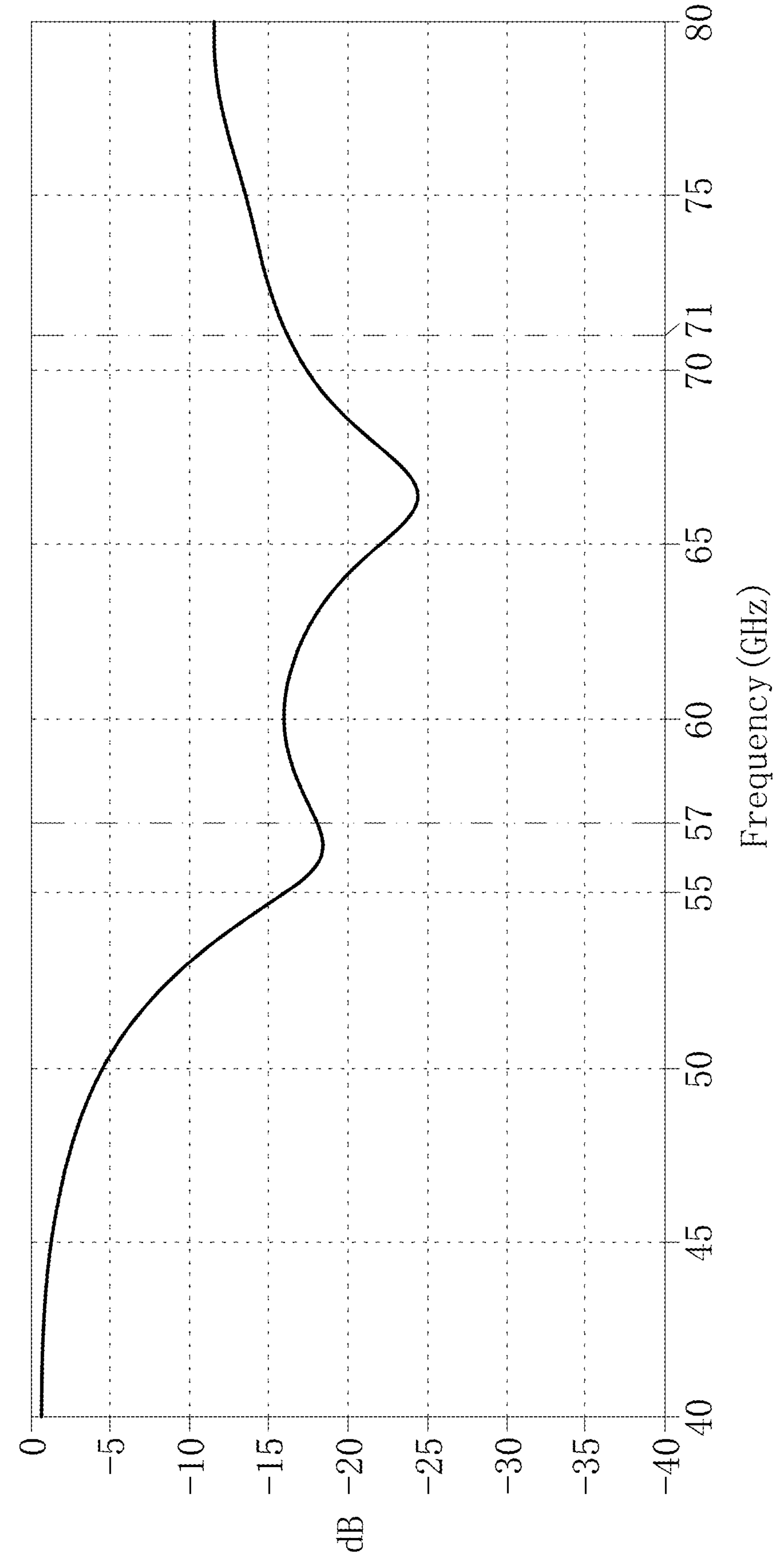
FIG. 11 is a schematic frequency response diagram of the antenna structure according to the first embodiment of the present disclosure.

In addition, as shown in FIG. 11, it can be clearly seen in the frequency response diagram of S parameters that, the return loss of the present embodiment in the n263 frequency band (i.e., from 57 GHz to 71 GHZ) of the second frequency range (FR2) in the 5G NR frequency band is greater than 10 dB. Accordingly, the antenna structure 100 of the present embodiment is very suitable for application in the 5G millimeter wave frequency band or higher frequency bands.

Figure 12:
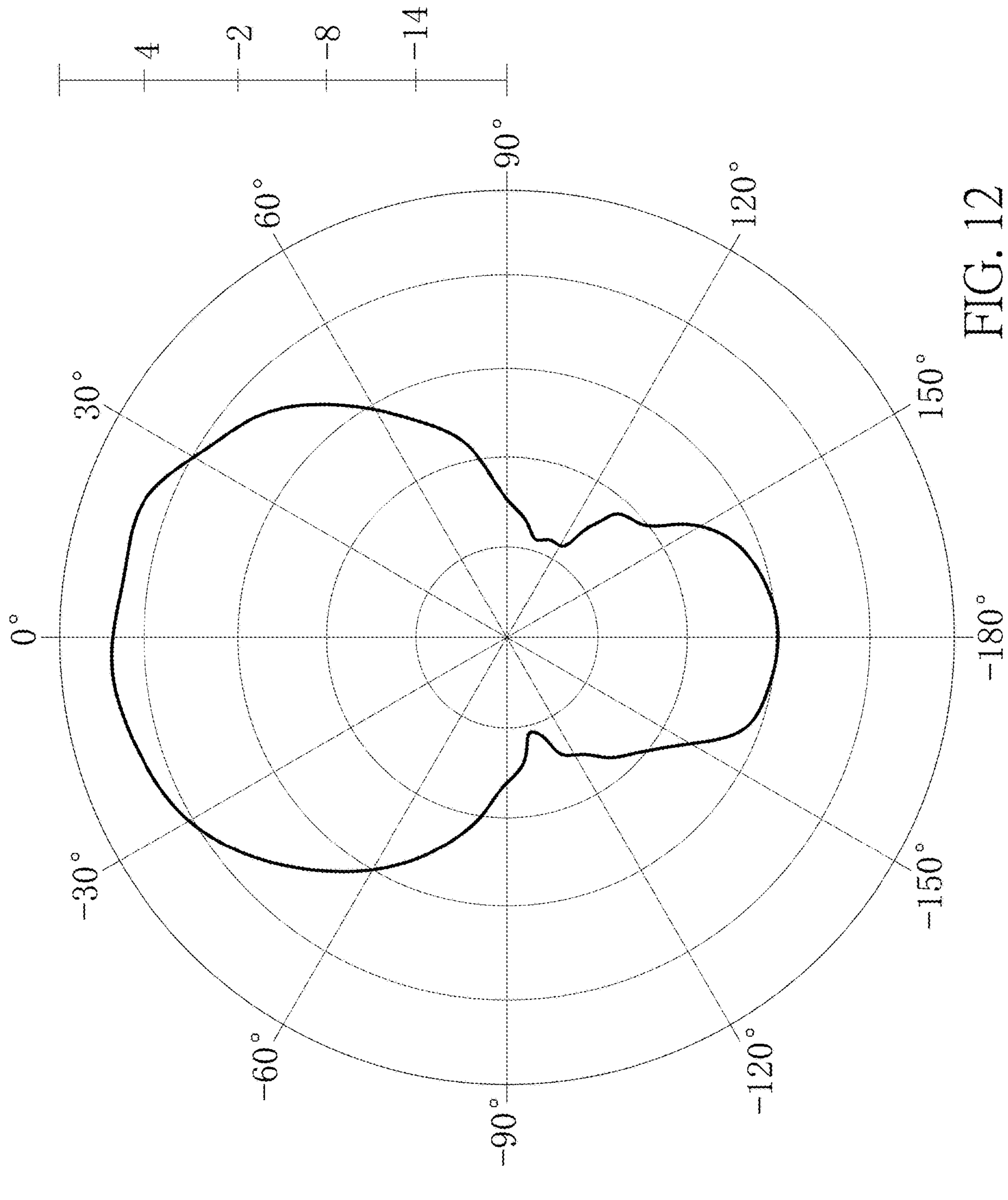
FIG. 12 is a schematic diagram of a radiation of the antenna structure in an H-plane according to the first embodiment of the present disclosure.
Figure 13:
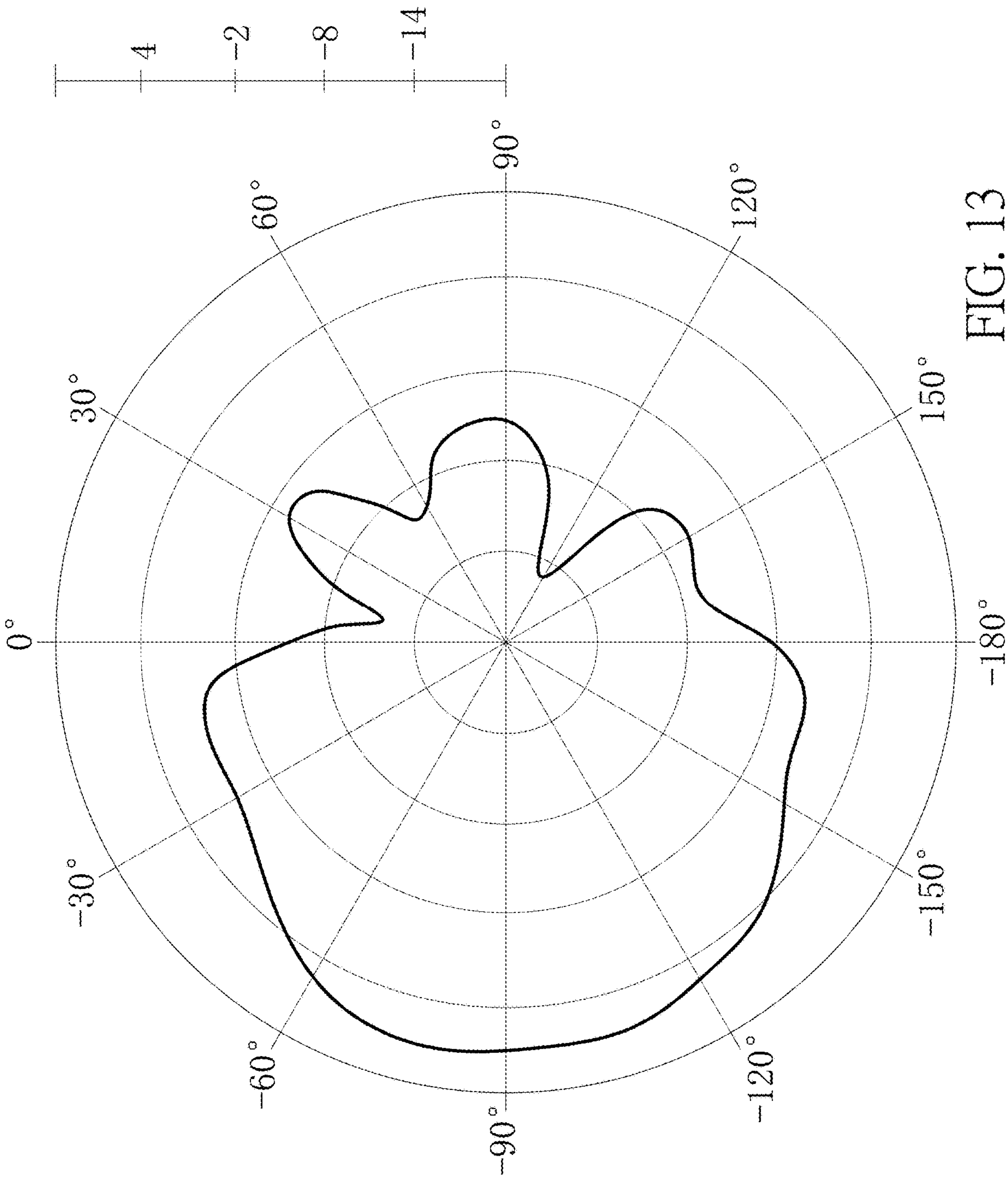
FIG. 13 is a schematic diagram of a radiation of the antenna structure in an E-plane according to the first embodiment of the present disclosure.

As shown in FIG. 12 and FIG. 13, FIG. 12 and FIG. 13 are respectively an H-plan realized gain plot and an E-plan realized gain plot. When a frequency of the antenna structure 100 of the present embodiment is 60 GHZ, a peak realized gain of the antenna structure 100 can reach 6.1 dB. Without considering the mismatch at a feeding terminal, the radiation efficiency of the antenna structure 100 can reach 94.5 percent.

TABLE I

| | Frequency (GHz) | dB (peak realized gain) | radiation efficiency |
|---|---|---|---|
| 1 | 57.000000 | 6.202215 | 0.944767 |
| 2 | 60.000000 | 6.109224 | 0.944799 |
| 3 | 64.000000 | 6.876615 | 0.946988 |
| 4 | 68.000000 | 6.770598 | 0.951227 |
| 5 | 71.000000 | 7.088312 | 0.951015 |

Second Embodiment

Figure 14:
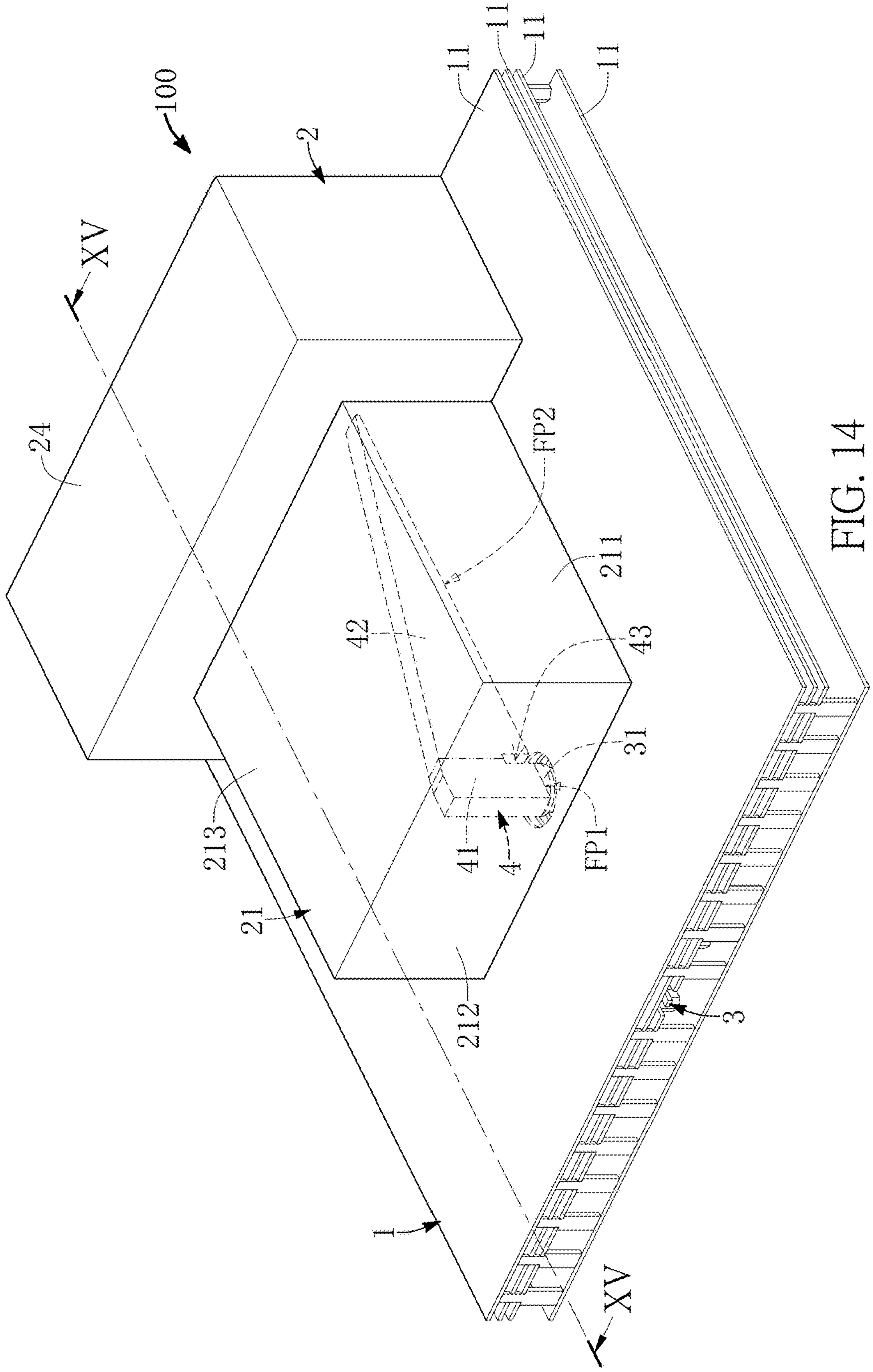
FIG. 14 is a schematic perspective view of an antenna structure according to a second embodiment of the present disclosure.
Figure 15:
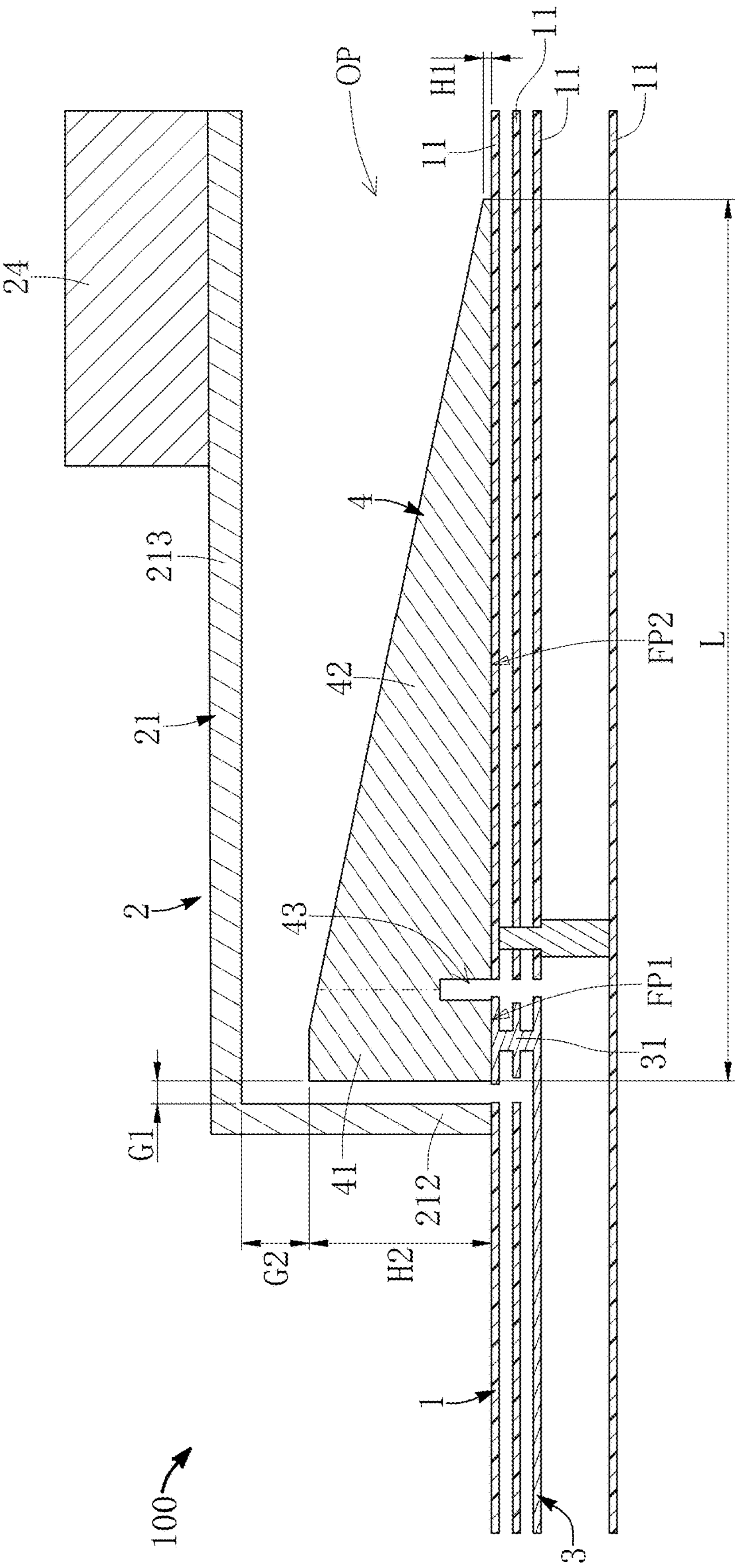
FIG. 15 is a schematic cross-sectional view taken along line XV-XV of FIG. 14.

Referring to FIG. 14 and FIG. 15, FIG. 14 and FIG. 15 show a second embodiment of the present disclosure. Since the present embodiment is similar to the above-mentioned embodiment, the similarities between the present embodiment and the above-mentioned embodiment will not be described in detail. The differences between the present embodiment and the above-mentioned embodiment are described as follows.

The shielding cover 2 further includes a C-shaped block 24, an inner edge of the C-shaped block 24 is attached to an outer wall of the shielding cover 2, and the C-shaped block 24 and the shielding cover 2 are aligned with an edge of the opening OP. That is, in the present embodiment, the C-shaped block 24 is configured to replace the two transverse extension plates 22 and the longitudinal extension plate 23 in the first embodiment.

Accordingly, the C-shaped block 24 can prevent the electric field of the electromagnetic wave signal to have diffracting and reflecting reactions at the edge of the opening OP as in the first embodiment, thereby reducing energy reflection, increasing antenna gain, and improving directivity.

Third Embodiment

Figure 16:
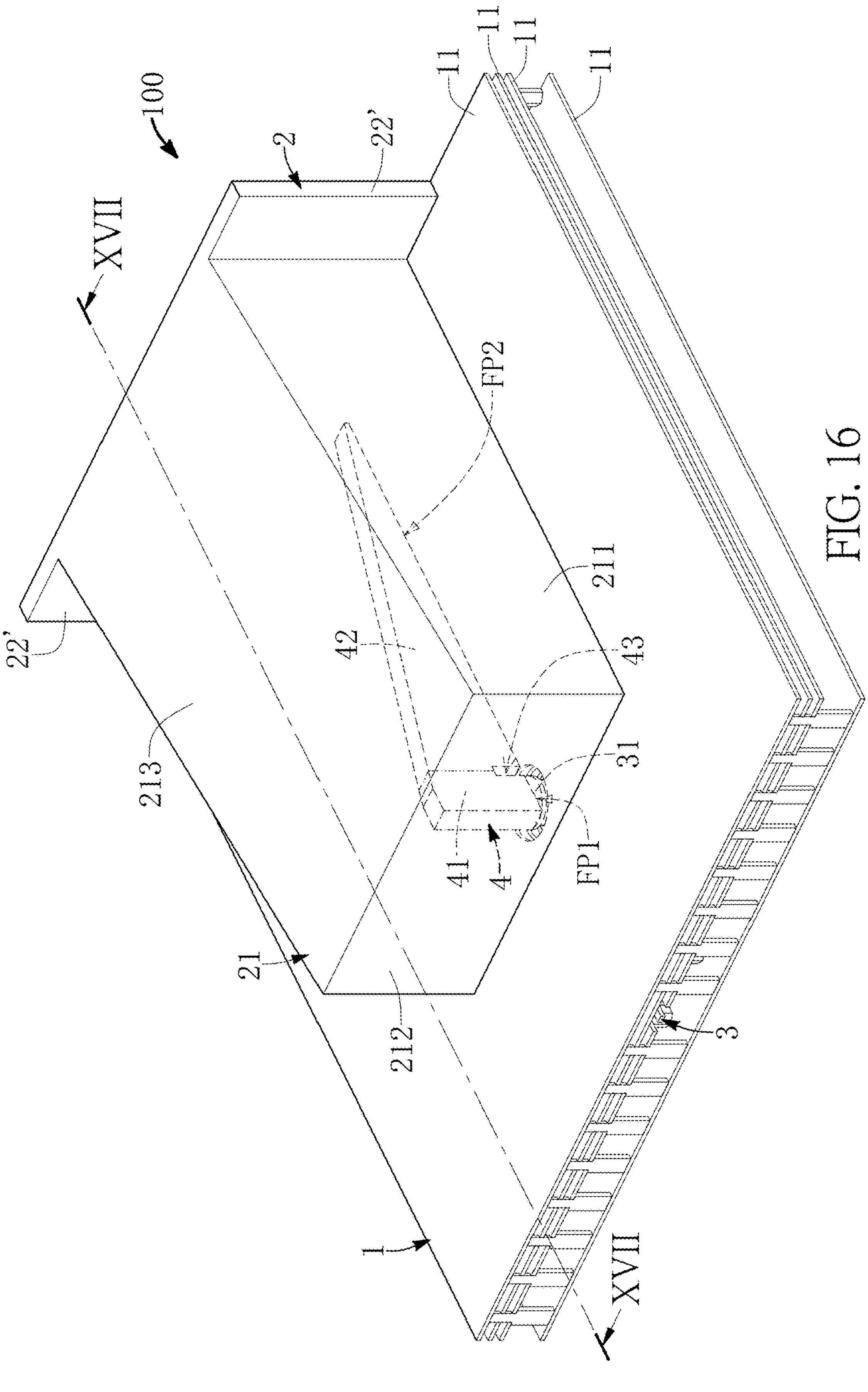
FIG. 16 is a schematic perspective view of an antenna structure according to a third embodiment of the present disclosure.
Figure 17:
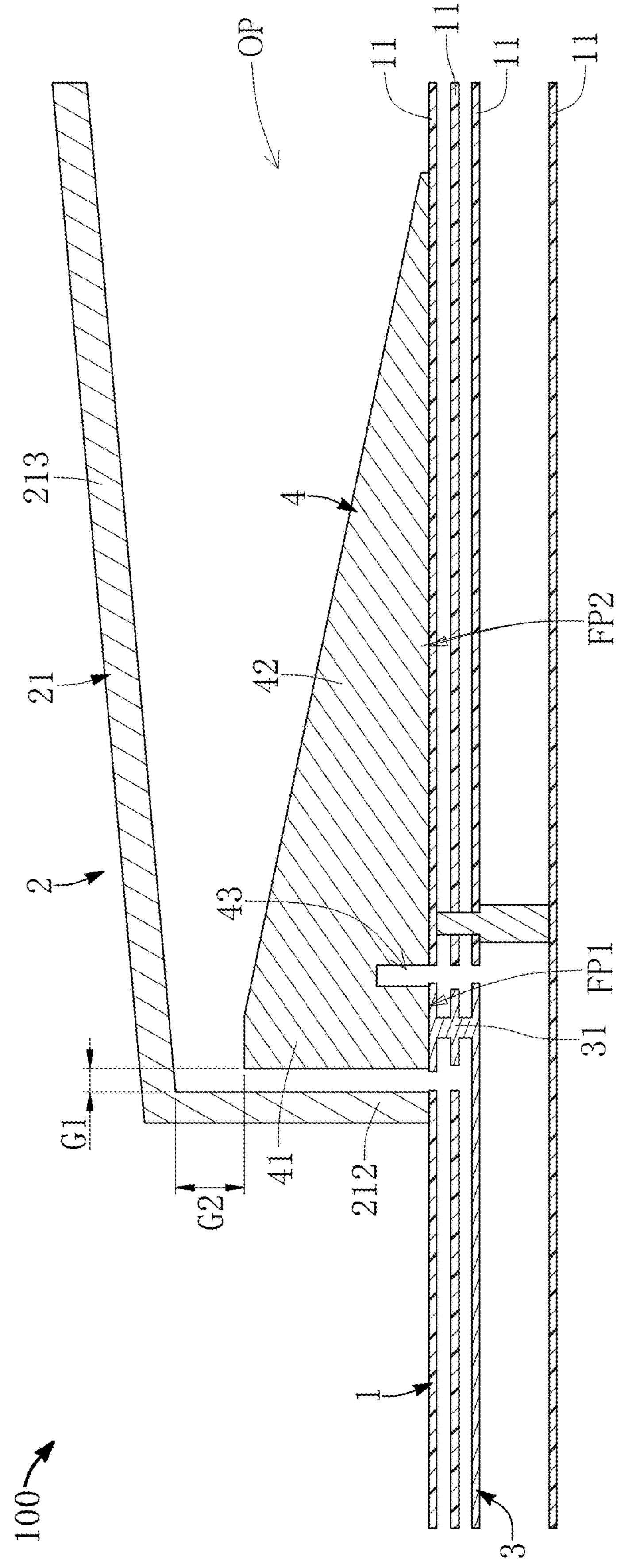
FIG. 17 is a schematic cross-sectional view taken along line XVII-XVII of FIG. 16.

Referring to FIG. 16 and FIG. 17, FIG. 16 and FIG. 17 show a third embodiment of the present disclosure. Since the present embodiment is similar to the above-mentioned embodiment, the similarities between the present embodiment and the above-mentioned embodiment will not be described in detail. The differences between the present embodiment and the above-mentioned embodiment are described as follows:

A height of the shielding body 21 is gradually increased along a direction that extends from the feeding strip line 3 toward the opening OP, such that the shielding body 21 is further configured to omit a configuration of the longitudinal extension plate 23; at the same time, the width of the two transverse extension plates 22' is reduced, thereby saving costs and reducing the overall volume.

In addition, a slope of the height of the shielding body 21 is within a range from 2 to 3 times a slope of a height of the metal sheet body 4. For sake of understanding, a practical example is given below for description, but the present disclosure is not limited to this example.

The height of the second vertical wall 212 of the shielding body 21 is 1.3 mm, the height from the horizontal wall 213 to the substrate assembly 1 is 1.7 mm, and the length of each of the first vertical walls 211 is 4.68 mm. Therefore, the slope of the height of the shielding body 21 is 4.68/(1.7−1.3)=11.7. Secondly, a lowest height H1 of the metal sheet body 4 is 0.1 mm, a highest height H2 of the metal sheet body 4 is 0.9 mm, and a length L of the metal sheet body 4 is 4.03 mm. Therefore, the slope of the height of the metal sheet body 4 is 4.03/(0.9−0.1)=5.038. It can be seen that in this example, the slope of the height of the shielding body 21 is 2.32 times the slope of the height of the metal sheet body 4.

It should be noted that, the shielding body 21 has a height change value, and the height change value is within a range of from 0.5 to 1.5 times a width of each of the transverse extension plates 22. In order to facilitate understanding, a practical example is given below for description, but the present disclosure is not limited to this example.

The height of the second vertical wall 212 of the shielding body 21 is 1.3 mm, and the height from the horizontal wall 213 to the substrate assembly 1 is 1.7 mm. Therefore, the height change value of the shielding body 21 is 1.7−1.3=0.4. Furthermore, the width of the transverse extension plate 22 is 0.6 mm. It can be seen that in this example, the height change value of the shielding body 21 in the present embodiment is 0.67 times the width value of each of the transverse extension plates 22.

Fourth Embodiment

Figure 18:
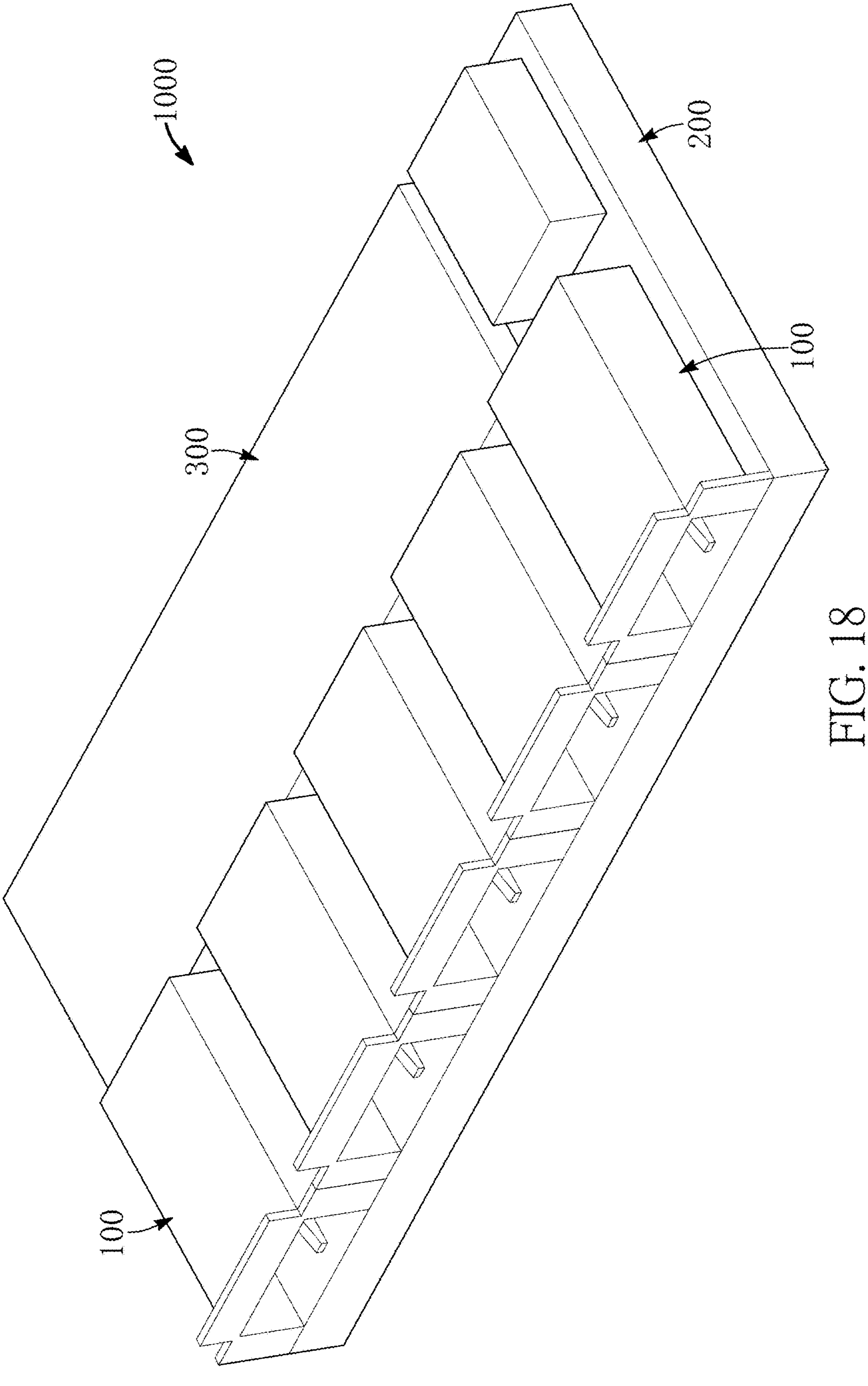
FIG. 18 is another schematic perspective view of an antenna module according to the third embodiment of the present disclosure.

Referring to FIG. 18, FIG. 18 shows a fourth embodiment of the present disclosure. Since the present embodiment is similar to the above-mentioned embodiment, the similarities between the present embodiment and the above-mentioned embodiment will not be described in detail. The differences between the present embodiment and the above-mentioned embodiment are roughly described as follows:

The antenna structure 100 of the present disclosure is applied to an antenna module 1000 in multiple quantities; that is, the antenna module 1000 of the present embodiment includes a circuit board 200, a plurality of antenna structures 100 disposed on the circuit board 200, and a plastic packaging assembly 300 disposed on the circuit board 200.

The antenna structures 100 are arranged in an array on the circuit board 200. A structure of each of the antenna structures 100 is the same as that of any one of the first to third embodiments, and is not reiterated in the present embodiment for sake of brevity.

The plastic packaging assembly 300 and the plurality of antenna structures 100 are jointly located on a side of the circuit board 200, and the plastic packaging assembly 300 is located on a side of the plurality of antenna structures 100, but the present disclosure is not limited thereto. For example, in other embodiments not shown in the present disclosure, the plastic packaging assembly 300 and the antenna structures 100 can be respectively disposed on two opposite sides of the circuit board 200. In practice, the plastic packaging assembly 300 is used to package millimeter wave chips and passive components.

It is worth mentioning that, the antenna module 1000 is based on architectures of various types of the antenna module 1000, and the antenna module 1000 can be installed horizontally on lateral sides of mobile devices (e.g., smartphones) to increase configuration flexibility.

Fifth Embodiment

Figure 19:
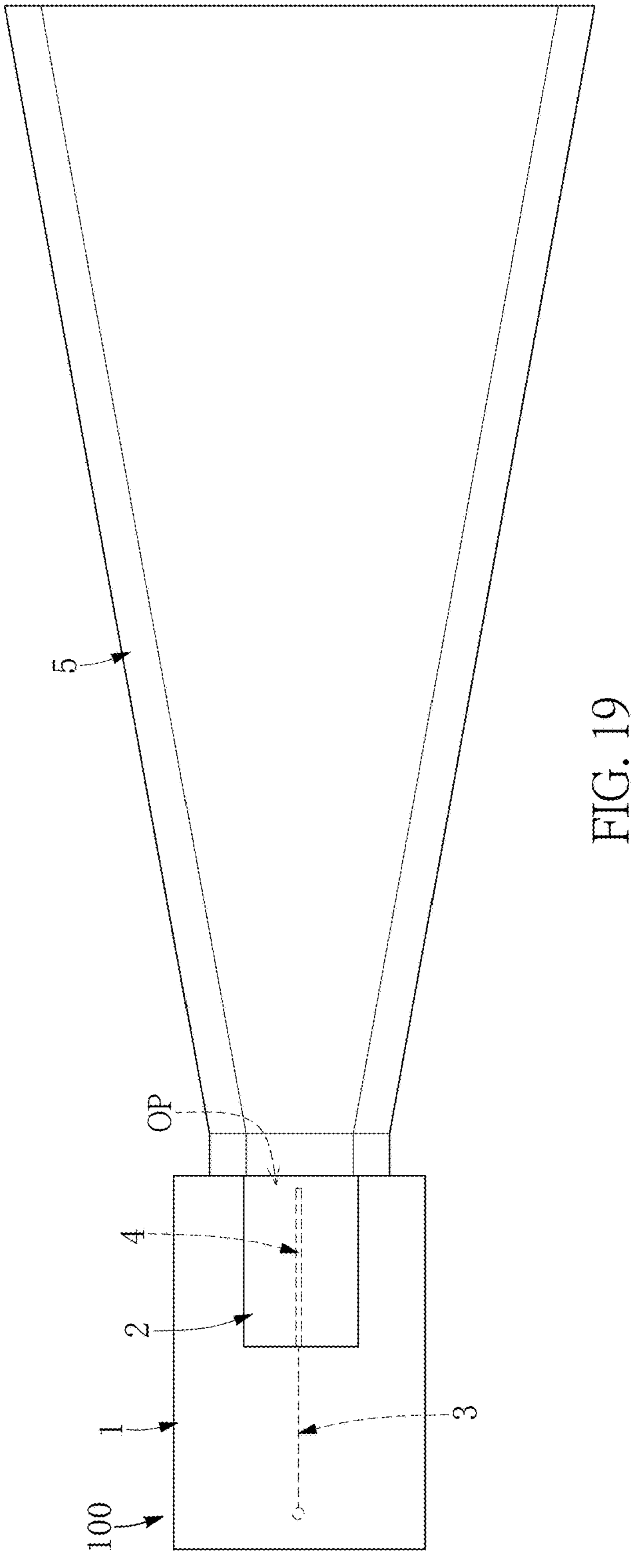
FIG. 19 is a schematic perspective view of the antenna structure applied to a horn antenna according to a fourth embodiment of the present disclosure.

Referring to FIG. 19, FIG. 19 is a fifth embodiment of the present disclosure. Since the present embodiment is similar to the above-mentioned embodiment, the similarities between the present embodiment and the above-mentioned embodiment will not be described in detail. The differences between the present embodiment and the above-mentioned embodiment are roughly described as follows:

The opening OP of the antenna structure 100 of the present embodiment is connected to a horn antenna 5, and the horn antenna 5 has an input terminal and an output terminal. The input terminal of the horn antenna 5 is connected to the opening OP of the shielding cover 2, and an inner diameter of the horn antenna 5 is gradually increased from the input terminal to the output terminal. The horn antenna 5 is arranged on the substrate assembly 1 in a ground-signal-ground (G-S-G) detection point manner, such that the present disclosure can be applied to the path loss correction of the antenna measurement room.

Beneficial Effects of the Embodiments

In conclusion, in the antenna structure and the antenna module provided by the present disclosure, by virtue of "the metal sheet body being erected on the substrate assembly and being located in the coverage region; and the height of the metal sheet body being decreased along the direction that extends from the feeding point toward the opening", the feeding strip line is configured to emit an electromagnetic wave signal in a single and horizontal direction through the metal sheet body and the shielding cover, such that the feeding strip line is not limited by the installation position in the mobile device.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna structure, comprising:

a substrate assembly;

a shielding cover disposed on the substrate assembly, wherein a side of the shielding cover has an opening;

a feeding strip line embedded in the substrate assembly, wherein the feeding strip line has a feeding point exposed from the substrate assembly, the feeding point is located on a coverage region defined by orthogonally projecting the shielding cover onto the substrate assembly, and the feeding point is located on a side of the substrate assembly away from the opening; and a metal sheet body erected on the substrate assembly and located in the coverage region, wherein a height of the metal sheet body is decreased along a direction from the feeding point toward the opening, the metal sheet body has a first pin and a second pin, the first pin is electrically coupled to the feeding point, and the second pin is electrically coupled to a ground member of the substrate assembly;

wherein the metal sheet body includes a notch facing the substrate assembly; wherein the metal sheet body has a first portion and a second portion that are separated by the notch, the first portion being adjacent to the feeding point and the second portion being adjacent to the opening; wherein the first portion has the first pin, and the second portion has the second pin;

wherein the feeding strip line is configured to emit an electromagnetic wave signal in a single and horizontal direction through the metal sheet body and the shielding cover.

2. The antenna structure according to claim 1, wherein the shielding cover includes:

a shielding body having the opening; and two transverse extension plates that extend from two opposite sides of the shielding body, wherein two projection regions defined by orthogonally projecting the two transverse extension plates onto the substrate assembly are parallel to each other.

3. The antenna structure according to claim 2, wherein the shielding cover further includes a longitudinal extension plate that extends from a side of the shielding body away from the substrate assembly, and wherein a projection region defined by orthogonally projecting the longitudinal extension plate onto the substrate assembly is located between the two transverse extension plates.

4. The antenna structure according to claim 2, wherein a height of the shielding body increases towards the opening.

5. The antenna structure according to claim 4, wherein a slope of the height of the shielding body is within a range of from 2 times to 3 times a slope of a height of the metal sheet body.

6. The antenna structure according to claim 4, wherein the shielding body has a height change value, and the height change value is within a range of from 0.5 times to 1.5 times a width of each of the transverse extension plates.

7. The antenna structure according to claim 1, wherein the shielding cover further includes a C-shaped block, an inner edge of the C-shaped block is attached to an outer wall of the shielding cover, and the C-shaped block and the shielding cover are aligned with an edge of the opening.

8. The antenna structure according to claim 1, wherein a first gap is between the metal sheet body and a side wall of the shielding cover away from the opening, and a second gap is between the metal sheet body and another side wall of the shielding cover away from the substrate assembly; wherein the first gap is less than or equal to ½ of the second gap, and the first gap is less than or equal to ½ of a height of the notch.

9. An antenna module, comprising:

a circuit board; and a plurality of antenna structures disposed on the circuit board, each of the antenna structures including:

a substrate assembly;

a shielding cover disposed on the substrate assembly, wherein a side of the shielding cover has an opening;

a feeding strip line embedded in the substrate assembly, wherein the feeding strip line has a feeding point exposed from the substrate assembly, the feeding point is located on a coverage region defined by orthogonally projecting the shielding cover onto the substrate assembly, and the feeding point is located on a side of the substrate assembly away from the opening; and a metal sheet body erected on the substrate assembly and located in the coverage region, wherein a height of the metal sheet body is decreased along a direction from the feeding point toward the opening, the metal sheet body has a first pin and a second pin, the first pin is electrically coupled to the feeding point, and the second pin is electrically coupled to a ground member of the substrate assembly;

wherein the metal sheet body includes a notch facing the substrate assembly; wherein the metal sheet body has a first portion and a second portion that are separated by the notch, the first portion being adjacent to the feeding point and the second portion being adjacent to the opening; wherein the first portion has the first pin, and the second portion has the second pin;

wherein the feeding strip line is configured to emit an electromagnetic wave signal in a single and horizontal direction through the metal sheet body and the shielding cover.

* * * * *